United States Patent Office 3,070,642
Patented Dec. 25, 1962

3,070,642
SEPARATION OF BUTADIENE FROM HYDRO-CARBON MIXTURES
John W. Kraus, Wayne, and Eric W. Stern, East Orange, N.J., assignors to The M. W. Kellogg Company, Jersey City, N.J., a corporation of Delaware
No Drawing. Filed Oct. 30, 1959, Ser. No. 849,756
13 Claims. (Cl. 260—681.5)

This invention relates to the production of butadiene, and, in one of its aspects, relates to the separation of butadiene from hydrocarbon mixtures containing the same. Still more particularly, in this aspect, the invention relates to the separation of butadiene from hydrogen mixtures by a method of selective, or preferential absorption to form addition products through the use of a complexing agent.

In the commercial production of butadiene, one of the major problems which is encountered, is in effecting an efficient separation of butadiene from olefins and paraffins, particularly where butadiene is produced by the dehydrogenation of butene, butane, or their mixtures or by the cracking of hydrocarbons. Heretofore, in commercial applications, such separating agents as cuprous ammonium acetate have been employed for the removal of butadiene from the above mixtures. The use of silver nitrate, either alone or in conjunction with other compounds to aid in solvent extraction, has also been suggested as a complexing agent, in which the formed butadiene:silver nitrate addition complex is obtained as an aqueous extract phase, comprising a silver nitrate solution containing diolefin and olefin complexes. In any of the aforementioned processes, however, it has been found that substantially complete selectivity of the complexing agent for the butadiene is not attained, so that substantially large quantities of mono-olefins are found in the extract phase. Further separation treatment is required in effecting the removal of the formed mono-olefin addition complex from the complexing agent, before the butadiene addition complex, itself, can be subjected to a desorption treatment for the recovery of substantially pure butadiene. Hence, prior to our invention, no efficient and commercially attractive method has been proposed for the separation of butadiene from hydrocarbon mixtures.

It is, therefore, an object of this invention to provide an improved method for the separation of butadiene from hydrocarbon mixtures.

Another object of the invention is to provide an improved method for the separation of butadiene from the reaction product obtained by the dehydration of butene, butane and their mixtures or by the cracking of hydrocarbons, which is efficient and economically attractive from a commercial standpoint.

Still another object of the invention is to provide an improved method for the separation of butadiene from the reaction product obtained by the dehydrogenation of butene, butane and their mixtures or by the cracking of hydrocarbons, employing aqueous silver nitrate solutions as complexing agents.

Other objects and advantages inherent in the invention will become apparent to those skilled in the art from the accompanying description and disclosure.

We have now found that an efficient and economical separation of butadiene from hydrocarbon mixtures, and particularly from the reaction product obtained by the dehydrogenation of butene, and/or butane or from cracked hydrocarbons, is accomplished under conditions more fully hereinafter disclosed, by a method which incorporates the novel step of carrying out the extraction treatment with aqueous silver nitrate solutions in which the butadiene:silver nitrate addition complexes are obtained in the form of a separable crystalline solid yielding pure butadiene on decomposition. The extraction methods of the prior art, on the other hand, yield addition complexes which are dissolved in liquid phase and from which butadiene enriched mono-olefin-diolefin mixtures are liberated on decomposition. In general, in accordance with the improved process of the present invention, the hydrocarbon mixture comprising butadiene and other olefins and paraffins, is subjected to a solvent extraction treatment in which the hydrocarbon mixture is first contacted with an aqueous solution of silver nitrate, under critical temperature conditions, as more fully hereinafter discussed, to obtain a butadiene:silver nitrate compound or addition complex, in the form of a crystalline solid. This extract phase, comprising the aforementioned addition complex as a solid crystalline material, is next separated from the liquid phase which comprises, for the most part, aqueous silver nitrate solutions containing some dissolved silver nitrate mono- and diolefin complexes. The solid crystalline extract phase comprising butadiene:silver nitrate addition complexes is then heated to a temperature which is sufficiently high to desorb or break the addition complex (as more fully hereinafter discussed) and substantially pure butadiene is then recovered as a product of the process and in a high yield. In a preferred application, where the butadiene is present in the form of a reaction product obtained by the dehydrogenation of butene and/or butane or from cracked hydrocarbons, the aforementioned extraction treatment is carried out by bubbling the gaseous reaction product through the aqueous silver nitrate solution and results in the formation of a solid crystalline extract phase, which comprises solid butadiene:silver nitrate complexes while the gas phase comprises saturated and unreacted non-saturated material which can be recycled. This solid extract phase when subjected to the aforementioned heating or desorption treatment, results in the breaking of the butadiene:silver nitrate addition complexes which are present, and free butadiene is then separated as a product of the process.

In carrying out the aforementioned extraction treatment, the hydrocarbon mixture is contacted with the aqueous silver nitrate solution at a relatively low temperature which enables formation of the butadiene:silver nitrate complex to take place, as a crystalline solid material, but which is not sufficiently high to cause solution of most of the complex in the liquid phase. In general, the extraction treatment is carried out at a temperature between about 0° F. and about 60° F. Temperatures between about 10° F. and about 50° F. are normally preferred in effecting the optimum yield of complex formation. In this respect, it has been found that while the greatest yield of solid addition complexes is formed at the lowest temperatures within the aforementioned ranges, temperatures below 0° F., are impractical, because of freezing of the silver nitrate solutions. Conversely, temperatures above 60° F., apart from the fact that complex formation is reduced in quantity, further results in causing the addition complex to form, not as a solid material, but rather to be present in liquid phase, since the addition complex is dissolved in the aqueous silver nitrate solution. While the above extraction treatment is normally carried out at atmospheric pressure, it will be understood, of course, that it is within the ordinary skill of the operator to vary the above temperature conditions by a concomitant increase or decrease of pressure which is imposed upon the system.

Insofar as the concentration of the aqueous silver nitrate solution, as a complexing agent, is concerned, it has been found that as the concentration increases from about 1 molar to about 8 molar solutions, there is obtained an increased selectivity for the butadiene. In general, it has been found that as the aqueous silver nitrate concentration increases from 5 to 8 molar, the greatest proportionate range of addition complex is attained. The extraction treatment may be carried out in the form of a batchwise or a continuous operation.

Following the aforementioned extraction treatment, and after phase separation has taken place, the solid extract phase comprises the crystalline butadiene:silver nitrate addition complexes, and the liquid phase (for example, where the material treated comprises a reaction product obtained by the dehydrogenation of butene and/or butane or from cracked hydrocarbons) comprises, for the most part, butene in aqueous silver nitrate solution. The solid crystalline extract phase is then separated from the raffinate phase and is separately subjected to the desorption treatment by heating to a temperature sufficiently high, in order to insure the breaking of the formed addition complex.

In general, in carrying out the desorption treatment, a temperature between about 50° F. and about 200° F. is employed. Temperatures between about 70° F. and about 200° F. are normally preferred in effecting the breaking of the addition complexes to produce the optimum yield of free butadiene. Within this range, temperatures between about 70° F. and about 125° F. have been found most effective from a commercial standpoint. It should be understood, however, that regardless of which of the above temperature ranges are employed in the desorption step, the desorption treatment is carried out at a higher temperature than that which is employed in the extraction step. The desorption treatment, as is the case with respect to the aforementioned extraction treatment, is normally carried out at atmospheric pressure. Here also, however, it will be understood, that it is within the ordinary skill of the operator to vary the temperature conditions, within the above ranges, by increasing or decreasing the pressure imposed upon the system. For most practical purposes, pressures from a vacuum to about 1 atmosphere are preferred. In commercial operations, some pressure upon the system may be desirable, so that the most practical conditions reside within the range of from about 0.5 to about 1 atmosphere. In general, it can be said that the pressure conditions imposed upon the system with respect to either the extraction treatment or the desorption treatment, are not critical and may be varied by increasing or decreasing the temperature within the above ranges, as the operator may desire.

As indicated above, the extraction treatment may be carried out as a batchwise operation. For this purpose, any conventional type of apparatus is suitable and may be employed either in the form of a single or multiple-stage operation. Thus, the extraction treatment is preferably carried out by passing or bubbling the hydrocarbon mixture through an aqueous solution of silver nitrate, which is maintained at the desired temperature and pressure conditions. In such instances, it is preferred that the contact or mixing vessel be equipped with appropriate mixing or stirring means. After thorough mixing has been effected, the resulting mixture is permitted to settle so that a lower solid crystalline extract phase and upper liquid raffinate phase is formed. The raffinate phase may then be separated from the extract phase and the latter filtered to remove remaining liquid. The solid complex is then subjected to the desorption treatment. In the case of a continuous operation, hydrocarbon gas containing butadiene is countercurrently contacted with aqueous silver nitrate solution. The liquid phase, containing suspended solid complex is then filtered or centrifuged to separate the solid complex.

Following the separation of the aforementioned extract and raffinate phases, the aqueous silver nitrate solution comprising the raffinate phase may be recycled to the extraction step for further use. It will also be apparent that the mono-olefins can be recovered from the silver nitrate solution, if so desired, in either the same or in different treating zones or vessels. The silver nitrate from the solid extract phase may also be recycled after description of butadiene.

The following examples will serve to illustrate the improved process of the present invention, but are not intended to be considered as necessarily limiting thereto.

Example 1

A gas mixture containing 42.1% butane, 45.2% butene, and 12.7% butadiene was bubbled through an aqueous solution 8 M in $AgNO_3$ at 59° F. and atmospheric pressure. The exit gas analyzed as 46.6% butane, 45.6% butene, and 7.8% butadiene. The crystalline $AgNO_3$-butadiene complex which had precipitated was separated from the liquid by filtration. Care was taken to remove essentially all of the liquid from the solid. The solid complex was then decomposed by heating to 80° F., resulting in a gas phase consisting of butadiene of better than 98% purity.

Example 2

A gas mixture containing 25.3% butane, 31.3% butene, and 43.4% butadiene was bubbled through an aqueous solution 8 M in $AgNO_3$ at 59° F. and atmospheric pressure. The exit gas analyzed as 29.6% butane, 33.8% butene, and 36.6% butadiene. The crystalline $AgNO_3$-butadiene complex which had precipitated was separated from the liquid by filtration. Care was taken to remove essentially all of the liquid from the solid. The solid complex was then decomposed by heating to 80° F., resulting in a gas phase consisting of butadiene of better than 98% purity.

Example 3

The exit gas from Example 2 was used as the feed for this example. Repeating the operation of example 2, the exit gas was passed through an aqueous solution 8 M in $AgNO_3$ at 59° F. and atmospheric pressure. The resulting exit gas was analyzed as 33.9% butane, 36.3% butene, and 29.8% butadiene. The crystalline $AgNO_3$-butadiene complex which had precipitated was separated from the liquid by filtration. Care was taken to remove essentially all of the liquid from the solid. The solid complex was then decomposed by heating to 80° F., resulting in a gas phase consisting of butadiene of better than 98% purity.

From the foregoing description, it will be seen that there has been provided a novel and improved method for the separation of butadiene from hydrocarbon mixtures, with particular applicability to the separation of butadiene from the reaction product obtained by the dehydrogenation of butene and/or butane, or from cracked hydrocarbons. The relatively high degree of purity of the butadiene after a single extraction makes this method economically attractive from a commercial standpoint. While a particular embodiment of the process of the present invention has been described for the purpose of illustration, it should be understood that various modifications and adaptations thereof which will be obvious to those skilled in the art may be made without departing from the spirit of the invention.

We claim:

1. A process for the separation of butadiene from a hydrocarbon mixture comprising butadiene and mono-olefins which comprises contacting said mixture with a mixture consisting of an aqueous solution of silver nitrate having a molarity between about 1 to about 8 at a temperature between about 0° F. and about 60° F. to form a solid butadiene:silver nitrate addition complex.

2. A process for the separation of butadiene from a hydrocarbon mixture comprising butadiene and paraffins which comprises contacting said mixture with a mixture consisting of an aqueous solution of silver nitrate having a molarity between about 1 to about 8, at a temperature between about 0° F. and about 60° F. to form a solid butadiene:silver nitrate addition complex.

3. A process for the separation of butadiene from a hydrocarbon mixture containing butadiene which comprises contacting said mixture with a mixture consisting of an aqueous solution of silver nitrate having a molarity between about 1 to about 8, at a temperature between about 0° F. and about 60° F. to form a solid extract phase comprising a butadiene:silver nitrate addition complex, separating said extract phase from said hydrocarbon mixture, heating said extract phase to decompose said addition complex, and recovering butadiene from said extract phase.

4. A process for the separation of butadiene from a hydrocarbon mixture containing butadiene which comprises contacting said mixture with a mixture consisting of an aqueous solution of silver nitrate having a molarity between about 1 to about 8 at a temperature between about 0° F. and about 60° F. to form a solid extract phase comprising a butadiene:silver nitrate addition complex, separating said extract phase from said hydrocarbon mixture, heating said extract phase at a temperature between about 50° F. and about 200° F. to decompose said addition complex, and recovering butadiene from said extract phase.

5. A process for the separtion of butadiene from a hydrocarbon mixture containing butadiene which comprises contacting said mixture with a mixture consisting of an aqueous solution of silver nitrate having a molarity between about 1 to about 8 at a temperature between about 10° F. and about 50° F. to form a solid extract phase comprising a butadiene:silver nitrate addition complex, separating said extract phase from said hydrocarbon mixture, heating said extract phase at a temperature between about 70° F. and about 200° F. to decompose said addition complex, and recovering butadiene from said extract phase.

6. A process for the separation of butadiene from a hydrocarbon mixture containing butadiene which comprises contacting said mixture with a mixture consisting of an aqueous solution of silver nitrate having a molarity between about 1 to about 8 at a temperature between about 10° F. and about 50° F. to form a solid extract phase comprising a butadiene:silver nitrate addition complex, separating said extract phase from said hydrocarbon mixture, heating said extract phase at a temperature between about 70° F. and about 125° F. to decompose said addition complex, and recovering butadiene from said extract phase.

7. A process for the separation of butadiene from a hydrocarbon mixture comprising butadiene, mono-olefins and paraffins which comprises contacting said mixture with a mixture consisting of an aqueous solution of silver nitrate having a molarity between about 1 to about 8 at a temperature between about 0° F. and about 60° F. to form a solid extract phase comprising a butadiene:silver nitrate addition complex, separating said extract phase from said hydrocarbon mixture, heating said extract phase at a temperature between about 50° F. and about 200° F. to decompose said addition complex, and recovering butadiene from said extract phase.

8. A process for the separation of butadiene from a hydrocarbon mixture containing butadiene which comprises contacting said mixture with a mixture consisting of an aqueous solution of silver nitrate having a molarity between about 1 to about 8 at a temperature between about 0° F. and about 60° F. to form a solid butadiene:silver nitrate addition complex.

9. A process for the separation of butadiene from a hydrocarbon mixture containing butadiene which comprises contacting said mixture with a mixture consisting of an aqueous solution of silver nitrate having a molarity between about 5 to about 8 at a temperature between about 10° F. and about 50° F. to form a solid butadiene:silver nitrate addition complex.

10. A process for the separation of butadiene from the reaction product obtained by the dehydrogenation of a material selected from the group consisting of butene and butane which comprises contacting said reaction product with a mixture consisting of an aqueous solution of silver nitrate having a molarity between about 1 to about 8 at a temperature between about 0° F. and about 60° F. to form a solid extract phase comprising a butadiene:silver nitrate addition complex.

11. A process for the separation of butadiene from the reaction product obtained by the cracking of a hydrocarbon which comprises contacting said reaction product with a mixture consisting of an aqueous solution of silver nitrate having a molarity between about 1 to about 8 at a temperature between about 0° F. and about 60° F. to form a solid extract phase comprising a butadiene:silver nitrate addition complex.

12. A process for the separation of butadiene from the reaction product obtained by the dehydrogenation of butene which comprises contacting said reaction product with a mixture consisting of an aqueous solution of silver nitrate having a molarity between about 1 to about 8 at a temperature between about 0° F. and about 60° F. to form a solid extract phase comprising a butadiene:silver nitrate addition complex.

13. A process for the separation of butadiene from the reaction product obtained by the dehydrogenation of butene which comprises contacting said reaction product with a mixture consisting of an aqueous solution of silver nitrate having a molarity between about 1 to about 8 at a temperature between about 0° F. and about 60° F. to form a solid extract phase comprising a butadiene:silver nitrate addition complex, separating said extract phase from said reaction product, heating said extract phase to decompose said addition complex, and recovering butadiene from said extract phase.

References Cited in the file of this patent

UNITED STATES PATENTS

| 2,391,404 | Friedman et al. | Dec. 25, 1945 |
| 2,523,681 | Cole | Sept. 26, 1950 |

OTHER REFERENCES

Moor et al: "Materials on Cracking and Chemical Treatment of Cracked Products," Khimteoret (Leningrad), vol. 2 (1935), pages 157–164 (U.O.P. Translation S–153, 7 pages).